(12) United States Patent
Bazyari et al.

(10) Patent No.: US 11,046,894 B2
(45) Date of Patent: Jun. 29, 2021

(54) MIXED OXIDE NANOCOMPOSITE CATALYST-ADSORBENT FOR OXIDATIVE DESULFURIZATION OF LIQUID HYDROCARBON FUELS

(71) Applicants: Amin Bazyari, Tehran (IR); Akbar Valaei, Tabriz (IR); Seyedeh Fatemeh Musavi, Sari (IR)

(72) Inventors: Amin Bazyari, Tehran (IR); Akbar Valaei, Tabriz (IR); Seyedeh Fatemeh Musavi, Sari (IR)

(*) Notice: Subject to any disclaimer, the term of this patent is extended or adjusted under 35 U.S.C. 154(b) by 165 days.

(21) Appl. No.: 16/519,143

(22) Filed: Jul. 23, 2019

(65) Prior Publication Data

US 2020/0071624 A1    Mar. 5, 2020

(51) Int. Cl.
  *B01J 20/06* (2006.01)
  *B01J 35/10* (2006.01)
  *C10G 25/00* (2006.01)
  *B01J 20/26* (2006.01)
  *B01J 20/30* (2006.01)
  *B82Y 40/00* (2011.01)
  *B82Y 30/00* (2011.01)

(52) U.S. Cl.
  CPC ............ *C10G 25/003* (2013.01); *B01J 20/06* (2013.01); *B01J 20/262* (2013.01); *B01J 20/3078* (2013.01); *B01J 35/10* (2013.01); *B82Y 30/00* (2013.01); *B82Y 40/00* (2013.01)

(58) Field of Classification Search
  None
  See application file for complete search history.

(56) References Cited

U.S. PATENT DOCUMENTS 8,283,498 B2 † 10/2012 Litz
9,512,151 B2 † 12/2016 Litz
(Continued)

OTHER PUBLICATIONS

Gorbunova et al., "Poly(ethylene glycol) as structure directing agent in sol-gel synthesis of amorphous silica". Microporous and Mesoporous Materials: vol. 190 (May 15, 2014), pp. 146-151 (published online Feb. 12, 2014).†

*Primary Examiner* — Tam M Nguyen (57) ABSTRACT

A nanocomposite composition for oxidative desulfurization of liquid hydrocarbon fuels, is disclosed. The nanocomposite composition comprises an amorphous mesoporous titania-silica ($TiO_2$—$SiO_2$) nanocomposite oxidative desulfurization (ODS) catalyst-adsorbent, including, a chelating agent, an alcohol, an alkoxides precursor of silica and titania, water, an organic polymer and a textural agent. The nanocomposite ODS catalyst-adsorbent is prepared with the aid of polyethylene glycol (PEG) as directing agent and citric acid (CA) as chelating agent. The PEG increases the specific surface area and average pore diameter of ODS catalyst-adsorbent, which facilitates the diffusion of bulky sulfur compounds into porosities of catalyst and adsorption of oxidized sulfur compounds on the catalyst surface. The citric acid controls the hydrolysis and condensation of titanium precursor, which improves ODS performance of catalyst-adsorbent. Further, the prepared ODS catalyst-adsorbent is a dual function material capable of catalyzing the oxidation sulfur compounds and their removal to an ultra-low level in hydrocarbon fuel.

9 Claims, 4 Drawing Sheets

(56) References Cited

U.S. PATENT DOCUMENTS

| | | |
|---|---|---|
| 10,246,647 B2 † | 4/2019 | Litz |
| 2013/0158322 A1* | 6/2013 | Nyce ........................ C07C 11/04 585/330 |
| 2015/0209766 A1* | 7/2015 | Xavier ................. B01J 37/0009 502/220 |
| 2017/0174526 A1* | 6/2017 | Banerjee ................... E06B 9/24 |

\* cited by examiner
† cited by third party

MIXED OXIDE NANOCOMPOSITE CATALYST-ADSORBENT FOR OXIDATIVE DESULFURIZATION OF LIQUID HYDROCARBON FUELS

BACKGROUND OF THE INVENTION

Fossil fuels are the most dominant and widely used source of energy in the world. There are different types of fossil fuels ranging from petroleum fractions to coal, tar sands, and shale oil, used for various applications such as automotive engines, boilers, furnaces, and power plants. The liquid hydrocarbon fuels such as diesel, gasoline, kerosene, jet fuel, gas condensate, fuel oil, etc. comprises sulfur compounds as wide varieties of organic molecules. During combustion, the sulfur compounds are converted into sulfur oxides ($SO_x$) and emitted to the environment. The emitted sulfur oxides react with the moisture in the atmosphere, which contributes to the adverse environmental effects such as air pollution and acid rain. Besides, the traces of sulfur compounds in fuels poison the catalytic converters of motor vehicles, which reduce their efficiency toward abatement of pollutants such as carbon monoxide, unburned hydrocarbons and nitrogen oxides.

The environmental concerns are driving the refiners to extensively remove the sulfur compounds of transportation fuels such as diesel. According to the United States Environmental Protection Agency (US EPA) regulations, maximum sulfur content in gasoline and diesel is in the range of about 10-30 ppmw and 15 ppmw, respectively. These regulations are developed to diminish the negative impacts of sulfur oxides ($SO_x$) emissions on the environment. Therefore, many countries are initiated to phase-in more rigorous regulations to reduce the amount of sulfur in transportation fuels. The legal requirements plus new applications such as fuel cells, motivates the scientists and industrialists to develop more efficient technologies for ultra-deep desulfurization of liquid fossil fuels.

The ultra-deep desulfurization of fossil fuels such as diesel, gasoline, kerosene, jet fuel, gas condensate, fuel oil, etc. is one of the most important duties of the oil refining industry. The current commercial technology for removing sulfur compounds from hydrocarbon fuels is hydrodesulfurization (HDS). HDS is a traditional industrial process to reduce sulfur content of fossil fuels and very efficient for removing mercaptans, sulfides, disulfides and some derivatives of thiophene. The HDS uses hydrogen in the presence of a catalyst, typically Co(Ni)—Mo(W) supported on alumina to convert mercaptans, sulfides, disulfides and thiophene to sulfur-free hydrocarbon fuel as the main product and the hydrogen sulfide byproduct is sent to Claus process (gas desulfurizing process) to produce elemental sulfur.

Further, HDS uses higher reaction temperatures and pressures typically range from 260° C. to 400° C. and 3 to 5 MPa, respectively, to produce ultra-low sulfur fuels, which increases both capital and operating costs. The higher temperature and hydrogen pressure may also deteriorate the fuel quality and fuel property such as lubricity due to hydrogenation of unsaturated components, which in turn can cause further problems during fuel utilization such as high hydrogen consumption and unfavorable side reactions, for eliminating refractory sulfur components like dibenzothiophene (DBT) and its derivatives.

Moreover, the effectiveness of HDS process for removing refractory sulfur compounds of the above-mentioned fuels such as benzothiophene (BT), dibenzothiophene (DBT), 4,6 dimethyl dibenzothiophene (4,6 DMDBT), their alkyl derivatives, etc. is not satisfactory. The heavier hydrocarbon cuts (boiling range>150° C.) contain multi-ring aromatic organosulfur compounds such as benzothiophenes, dibenzothiophenes and their alkylated derivatives, known as refractory sulfur compounds, which are much more difficult to hydrotreat than the mercaptans, sulfides, disulfides and thiophene contained in the lighter hydrocarbon cuts. Therefore, higher temperatures and hydrogen pressures are required to remove the refractory sulfur compounds from heavier hydrocarbon cuts using HDS technology.

Furthermore, HDS is very effective at desulfurizing lighter hydrocarbon fuels such as gasoline and naphtha, but sulfur removal from heavier cuts such as kerosene, diesel and fuel oil encounter a greater challenge. Moreover, HDS will continue to face more challenges in the future as environmental regulations become more severe and crudes become heavier and more enriched with refractory sulfur compounds. Another problem facing the refining industry is that meeting current and future sulfur standards also forces refiners to increase their $CO_2$ greenhouse gas emissions. This is based on the fact that using hydrogen gas to remove sulfur from hydrocarbon fuels is very energy intensive and leaves a large $CO_2$ emission footprint.

Therefore, researchers have focused on developing new complementary technologies for HDS to obtain ultra-low sulfur fuels. These technologies include bio-desulfurization (BDS), adsorptive desulfurization (ADS), extractive desulfurization (EDS) and oxidative desulfurization (ODS).

The BDS process makes use of enzymes and metabolic pathways with low desulfurization rate which necessitates the deployment of large reactor volume. In addition, performance of most adsorbents employed in ADS technologies are not adequate for ultra-deep desulfurization of liquid fossil fuels. Further, the efficiency of EDS is limited by the solubility of the sulfur compounds and their selective extraction by the solvent. Moreover, solvents have different boiling points from sulfur compounds. Among these methods, ODS technology using heterogeneous catalysts is a promising process for removing refractory organosulfur compounds at mild operation conditions (T<100° C. and P=1 atm). This reduces the capital and operating costs as well as design of desulfurization reactor is much simpler than HDS.

Although, various ODS catalyst formulations have been developed so far, there is a need for a high-performance, economical and green catalyst, which is capable of removing refractory sulfur compounds of liquid hydrocarbon fuels at a short time of ODS reaction. Titanium-containing catalysts exhibit high catalytic activities for oxidation reactions. For instance, crystalline titanium silicalite-1 (TS-1) has been reported to be a very effective catalyst for oxidation of thiophene, but its catalytic activity for oxidation of BT and DBT is very low due to its small pore size, which hinders the entrance of bulky sulfur compounds into the narrow channels of TS-1 where most active sites are located.

Therefore, many efforts have been devoted to prepare a new crystalline Ti-containing silica molecular sieves with larger pore sizes, such as Ti-HMS, Ti-SBA-15, Ti-SBA-16, Ti-WMS, Ti-beta, Ti-MWW, as catalysts for the ODS of bulky sulfur compounds. However, these materials suffer from relatively low activities and/or poor stabilities. Moreover, the preparation methods of these crystalline titania-silica structures are performed in the presence of surfactants as structure-directing agents which make the synthesis recipe costly.

In light of the above-mentioned drawbacks, there is a need for a promising catalyst for reactions relating to bulky reactants, especially ones with pore sizes large enough to accommodate bulky sulfur compounds.

SUMMARY OF THE INVENTION

A composition for oxidative desulfurization (ODS) of liquid hydrocarbon fuels, is disclosed. The ODS is a promising method to remove sulfur compounds from hydrocarbon fuels in order to obtain an ultra-low sulfur fuel. In one embodiment, the method operates under mild operating conditions for the oxidation and removal of refractory sulfur compounds. The sulfur compounds of liquid fuels are selectively oxidized to sulfoxides and sulfones using an oxidant in the presence of a heterogeneous catalyst. The oxidized sulfur compounds have higher polarities than their parent sulfur compounds and could be removed from fuel via adsorption on the catalyst.

According to the present invention, the composition is a high-performance amorphous mesoporous titania-silica ($TiO_2$—$SiO_2$) nanocomposite oxidative desulfurization (ODS) catalyst-adsorbent. The amorphous mesoporous titania-silica ($TiO_2$—$SiO_2$) nanocomposite ODS catalyst-adsorbent efficiently removes refractory sulfur compounds from the liquid hydrocarbon fuels via adsorption on catalyst surface. The nanocomposite ODS catalyst-adsorbent further comprises a matrix and a metal oxide. The matrix is selected from at least any one of a silica, a alumina, a ceria, a zirconia, a niobia, and a combination of mixture of the matrix, and the metal oxide preferably selected from at least any one of oxides of titanium, a vanadium, a molybdenum, a tungsten, a chromium, a tin, a manganese and a combination of mixture of metal oxides. In one embodiment, the matrix and the metal oxide are used in a molar ratio in the ranges from 2:1 to 200:1. In one embodiment, the matrix and the metal oxide are used in a molar ratio in the ranges preferably from 10:1 to 50:1.

In one embodiment, the nanocomposite ODS catalyst-adsorbent comprises, a chelating agent, an alcohol, an alkoxides precursor of silica and titania, water, an organic polymer and a textural agent. A method for preparing the nanocomposite ODS catalyst-adsorbent comprises the following steps. At one step, a first solution is prepared, wherein the first solution comprises a chelating agent, an alcohol, alkoxides precursor of titania, and water. The chelating agent is dissolved in an alcohol to form a mixture, wherein the alkoxides precursor of titania and water are added to the mixture to form the first solution. At another step, a second solution is prepared, wherein the second solution comprises alkoxides precursor of silica, water, and the alcohol. The alkoxides precursor of silica is dissolved in water to form a mixture, wherein the alcohol is added to the mixture and agitated to form the second solution.

In some embodiments, the chelating agent is selected from at least any one of a citric acid, an isosteric acid, an isocitric acid, an aconitic acid (cis and trans), a tranexamic acid as tricarboxylic acids, a tartaric acid, a mellitic acid, a carboxylic acid, a dicarboxylic acid, a tricarboxylic acid, an aminopolycarboxylic acid, a polycarboxylic acid, and a combination of mixture of chelating agents. In one embodiment, the alkoxides precursor of silica comprises a tetraethyl orthosilicate (TEOS), a tetramethyl orthosilicate, a tetrapropyl orthosilicate, and a tetrabutylortho silicate. In one embodiment, the alkoxides precursor of titania comprises a tetraethyl orthotitanate, a titanium (IV) isopropoxide, a tetrabutyl orthotitanate (TBOT), a titanium chloride, and a titania.

At another step, the first solution and the second solution are mixed together to form a main solution. In one embodiment, mole ratio of the first solution and the second solution range from 2:1 to 200:1, and preferably ranges from 10:1 to 50:1. At another step, an organic polymer is added to the mixture and agitated for a predefined a period of time and temperature to form a viscose transparent gel. In one embodiment, the mixture is agitated for at least 2 hours at 50° C. to form the gel and aged at 50° C. for 48 hours. In some embodiments, the organic polymer is at least any one of a polyethylene glycol (PEG), a polyvinyl alcohol (PVA), a polyvinylpyrrolidone (PVP), a polyacrylic acid (PAA), a polyacrylamide (PAM), and a combination of mixture of the organic polymers.

At another step, the viscose transparent gel is calcinated in two ways. The gel is calcinated in air at a temperature of about 200° C. with heating rate of about 3° C./min for a period of about 3 hours. The calcinated viscose transparent gel is again calcinated at a temperature of about 600° C. for a period of about 3 hours with heating rate of about 1° C./min to prepare the amorphous mesoporous titania-silica ($TiO_2$—$SiO_2$) nanocomposite oxidative desulfurization (ODS) catalyst-adsorbent. The prepared amorphous mesoporous titania-silica ($TiO_2$—$SiO_2$) nanocomposite ODS catalyst-adsorbent efficiently removes refractory sulfur compounds from the liquid hydrocarbon fuels via adsorption on the catalyst surface. In one embodiment, the liquid hydrocarbon fuels include diesel fuel, kerosene, gasoline, gasoil, natural gas condensate, mazut, lubricant and bitumen.

According to the present invention, a method for performing desulfurization of liquid hydrocarbon fuels using the amorphous mesoporous titania-silica ($TiO_2$—$SiO_2$) nanocomposite ODS catalyst-adsorbent comprises the following steps. At one step, an oxidant agent is added to a hydrocarbon feedstock containing organosulfur compounds at a temperature ranges from 20° C. to 200° C. and the pressure ranges from 0.5 atm to 20 atm to produce a gaseous oxidant-enriched hydrocarbon feedstock. At another step, the amorphous mesoporous titania-silica ($TiO_2$—$SiO_2$) nanocomposite ODS catalyst-adsorbent is mixed with the produced gaseous oxidant-enriched hydrocarbon feedstock to perform desulfurization, thereby removing refractory sulfur compounds from the liquid hydrocarbon fuels.

In one embodiment, the desulfurization of liquid hydrocarbon fuels is performed in a reactor includes any one of a batch reactor, a fixed bed reactor, a moving bed reactor, and a continuous stirred tank reactor. Further, the method of producing nanocomposite ODS catalyst-adsorbent drastically enhances the ODS activity of the prepared titania-silica catalyst. In one embodiment, nanocomposite ODS catalyst-adsorbent is able to completely remove sulfur compounds in less than two minutes. Therefore, the developed dual function material is capable of oxidizing sulfur compounds of liquid feedstock and their selective removal to an ultra-low level at the same time. Further, it eliminates the need either for an extraction solvent in the ODS reactor or a subsequent extraction unit, which could substantially diminish the process cost.

One aspect of the present disclosure is directed to a composition for oxidative desulfurization of liquid hydrocarbon fuels, comprising: an amorphous mesoporous titania-silica ($TiO_2$—$SiO_2$) nanocomposite oxidative desulfurization (ODS) catalyst-adsorbent, including, a chelating agent, an alcohol, an alkoxides precursor of silica and titania, water, an organic polymer and a textural agent. In one embodiment, the chelating agent is selected from at least any one of a citric acid, an isosteric acid, an isocitric acid, an aconitic acid (cis and trans), a tranexamic acid as tricarboxylic acids, a tartaric acid, a mellitic acid, a carboxylic acid, a dicarboxylic acid, a tricarboxylic acid, an aminopolycarboxylic acid, a polycarboxylic acid, and a combination of mixture of chelating agents. In a related embodiment, the carboxylic acid includes saturated dicarboxylic acids and unsaturated dicarboxylic acids, wherein the saturated dicarboxylic acids include an adipic acid, and a succinic acid, wherein the unsaturated dicarboxylic acids include a maleic acid, a fumaric acid, a glutaconic acid (cis and trans), a muconic acid (cis-trans, cis-cis), a citraconic acid (cis).

In one embodiment, the alkoxides precursor of silica comprises a tetraethyl orthosilicate, a tetramethyl orthosilicate, a tetrapropyl orthosilicate, and a tetrabutylortho silicate. In another embodiment, the alkoxides precursor of titania comprises a tetraethyl orthotitanate, a titanium (IV) isopropoxide, a tetrabutyl orthotitanate, a titanium chloride, and a titania. In one embodiment, the organic polymer is at least any one of a polyethylene glycol (PEG), a polyvinyl alcohol (PVA), a polyvinylpyrrolidone (PVP), a polyacrylic acid (PAA), a polyacrylamide (PAM), and a combination of mixture of the organic polymers. In one embodiment, the textural agent is a polyethylene glycol.

In one embodiment, the liquid hydrocarbon fuels include diesel fuel, kerosene, gasoline, gasoil, natural gas condensate, mazut, lubricant and bitumen. In another embodiment, the amorphous mesoporous titania-silica ($TiO_2$—$SiO_2$) nanocomposite ODS catalyst-adsorbent efficiently removes refractory sulfur compounds from the liquid hydrocarbon fuels via adsorption on catalyst surface, wherein the amorphous mesoporous titania-silica ($TiO_2$—$SiO_2$) nanocomposite ODS catalyst-adsorbent further comprises a matrix and a metal oxide, wherein the matrix is selected from at least any one of a silica, a alumina, a ceria, a zirconia, a niobia, and a combination of mixture of the matrix, and the metal oxide preferably selected from at least any one of oxides of titanium, a vanadium, a molybdenum, a tungsten, a chromium, a tin, a manganese and a combination of mixture of metal oxides, wherein the matrix and the metal oxide are used in a molar ratio in the ranges from 2:1 to 200:1, and preferably ranges from 10:1 to 50:1.

Another aspect of the present disclosure is directed to a method for preparing an amorphous mesoporous titania-silica ($TiO_2$—$SiO_2$) nanocomposite oxidative desulfurization (ODS) catalyst-adsorbent, comprising: (a) preparing a first solution including, a chelating agent, an alcohol, alkoxides precursor of titania, and water; (b) preparing a second solution including, alkoxides precursor of silica, water, and the alcohol; (c) adding and mixing the first solution and the second solution to form a main solution; (d) adding an organic polymer to the mixture and agitating for at least 2 hours at 50° C. to form a viscose transparent gel and aged at 50° C. for 48 hours; and (e) calcining the viscose transparent gel in air at a 200° C. with heating rate of 3° C./min for 3 hours, followed by calcination at 600° C. for 3 hours with heating rate of 1° C./min to prepare the amorphous mesoporous titania-silica ($TiO_2$—$SiO_2$) nanocomposite oxidative desulfurization (ODS) catalyst-adsorbent.

In one embodiment, the first solution is prepared using by dissolving chelating agent in an alcohol to form a mixture; and adding alkoxides precursor of titania and water to the mixture to form the first solution. In another embodiment, the second solution is prepared using by dissolving alkoxides precursor of silica in water to form a mixture; and adding and agitating the alcohol to the mixture to form the second solution. In yet another embodiment, the mole ratio of the first solution and the second solution range from 2:1 to 200:1, and preferably ranges from 10:1 to 50:1.

In one embodiment, the alkoxide precursor of silica comprises a tetraethyl orthosilicate, a tetramethyl orthosilicate, a tetrapropyl orthosilicate, and a tetrabutylortho silicate, and the alkoxide precursor of titania comprises a tetraethyl orthotitanate, a titanium (IV) isopropoxide, a tetrabutyl orthotitanate, a titanium chloride, and a titania, and wherein the organic polymer is at least any one of a polyethylene glycol (PEG), a polyvinyl alcohol (PVA), a polyvinylpyrrolidone (PVP), a polyacrylic acid (PAA), a polyacrylamide (PAM), and a combination of mixture of the organic polymers. In one embodiment, the amorphous mesoporous titania-silica ($TiO_2$—$SiO_2$) nanocomposite ODS catalyst-adsorbent efficiently removes refractory sulfur compounds from the liquid hydrocarbon fuels via adsorption on the catalyst surface, wherein the liquid hydrocarbon fuels include diesel fuel, kerosene, gasoline, gasoil, natural gas condensate, mazut, lubricant and bitumen.

Another aspect of the present disclosure is directed to a method for performing desulfurization of liquid hydrocarbon fuels using the amorphous mesoporous titania-silica ($TiO_2$—$SiO_2$) nanocomposite ODS catalyst-adsorbent, comprising: adding oxidant agent to a hydrocarbon feedstock containing organosulfur compounds at a temperature ranges from 20° C. to 200° C. and the pressure ranges from 0.5 atm to 20 atm to produce a gaseous oxidant-enriched hydrocarbon feedstock; and mixing the amorphous mesoporous titania-silica ($TiO_2$—$SiO_2$) nanocomposite ODS catalyst-adsorbent with the produced gaseous oxidant-enriched hydrocarbon feedstock to perform desulfurization, thereby removing refractory sulfur compounds from the liquid hydrocarbon fuels, wherein the desulfurization of liquid hydrocarbon fuels is performed in a reactor includes any one of a batch reactor, a fixed bed reactor, a moving bed reactor, and a continuous stirred tank reactor.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

There is a need for a promising catalyst such as amorphous mesoporous $TiO_2$—$SiO_2$ mixed oxides for reactions relating to bulky reactants. The present invention relates to amorphous mesoporous $TiO_2$—$SiO_2$ nanocomposites with a pore size of large enough to accommodate the bulky sulfur compounds could be an active catalyst for oxidation of these molecules in presence of an oxidant. The present invention generally relates to a composition and method for desulfurization. More particularly, the present invention relates to a mixed oxide nanocomposite-based composition and method for oxidative desulfurization of liquid hydrocarbon fuels.

Oxidation desulfurization (ODS) is one of the most promising methods to obtain ultra-low sulfur fuels, which operates under mild operating conditions such as low reaction temperature (T<100° C.), low pressure (P=1 atm) and high reactivities of refractory sulfur species for the oxidation and removal of refractory sulfur compounds. In one embodiment, the sulfur compounds of liquid fuels are selectively oxidized to sulfoxides and sulfones using an oxidant such as organo hydroperoxides in the presence of heterogeneous catalyst. The oxidized sulfur compounds have higher polarities than their parent sulfur compounds. In one embodiment, the oxidized sulfur compounds are removed from fuel via adsorption on the catalyst. Further, the removal of oxidized sulfur compounds from the fuel are performed via a subsequent adsorption/extraction step.

According to the present invention, a composition, a method of preparing the composition and the method of using the composition for ODS of liquid hydrocarbon fuels are disclosed. In one embodiment, the composition is a high performance amorphous mesoporous titania-silica ($TiO_2$—$SiO_2$) nanocomposite ODS catalyst-adsorbent for oxidative desulfurization of liquid hydrocarbon fuels. The nanocomposite ODS catalyst-adsorbent comprises a chelating agent, an alcohol, an alkoxides precursor of silica and titania, water, an organic polymer and a textural agent. In one embodiment, the nanocomposite ODS catalyst-adsorbent is prepared by a modified sol-gel method with the aid of polymer and chelating agent.

In one embodiment, the polymers are used as textural agents from water-soluble polymers. The polymer is preferably selected from the group comprising polyethylene glycol (PEG), polyvinyl alcohol (PVA), polyvinyl pyrrolidone (PVP), polyacrylic acid (PAA), polyacrylic amid (PAM) and mixture thereof. The molecular weight of polymer is selected between the range of about 200 g/mole to about 100000 g/mole. In one embodiment, PEG is used as a textual agent for the preparation of catalyst-adsorbent. In one embodiment, the PEG is an inexpensive structure directing agent.

The PEG increases the specific surface area, average pore diameter and pore volume of the catalyst, which facilitates both diffusion of bulky recalcitrant sulfur compounds into porosities of the catalyst and adsorption of oxidized sulfur compounds on the catalyst surface. Further, the PEG could significantly increase the oxidation rate of bulky sulfur compounds and decrease the removal time of the oxidized sulfur compounds.

In one embodiment, the chelating agent is selected from the group comprising any one of carboxylic acid, dicarboxylic acid, tricarboxylic acid, amino polycarboxylic acids and polycarboxylic acids and the mixtures thereof. In one embodiment, the carboxylic acids are preferably selected from any one of adipic acid and succinic acid as saturated dicarboxylic acids. In another embodiment, the carboxylic acids are preferably selected from any one of maleic acid, fumaric acid, glutaconic acid (cis and trans), muconic acid (cis-trans, cis-cis), citraconic acid (cis) as unsaturated dicarboxylic acids. In one embodiment, the chelating agent is selected from any one of citric acid, isosteric acid, isocitric acid, aconitic acid (cis and trans), tranexamic acid as tricarboxylic acids, tartaric acid, mellitic acid. In one embodiment, the citric acid is selected as chelating agent for the preparation of amorphous mesoporous titania-silica nanocomposite ODS catalyst-adsorbent.

In one embodiment, the citric acid is a chelating agent for titanium precursor, which controls the hydrolysis and condensation of titanium precursor. Further, the chelating agent promotes the dispersion of titanium active sites or titanium spices on the silica matrix or surface of the silica, which significantly improves the ODS performance of the catalyst-adsorbent and reduces the required titanium loading of the catalyst-adsorbent. In one embodiment, the method enhances the ODS activity of the prepared titania-silica catalyst which is able to completely remove the sulfur compounds in less than two minutes. The ODS reaction is carried out in a reactor, wherein the reactor includes any one of a batch reactor, fixed bed reactor, moving bed reactor, continuous stirred tank reactor. Further, the reaction temperature is ranges from about 25° C. to about 200° C. and the reaction pressure is substantially between 1 atm to 20 atm.

Figure 1:
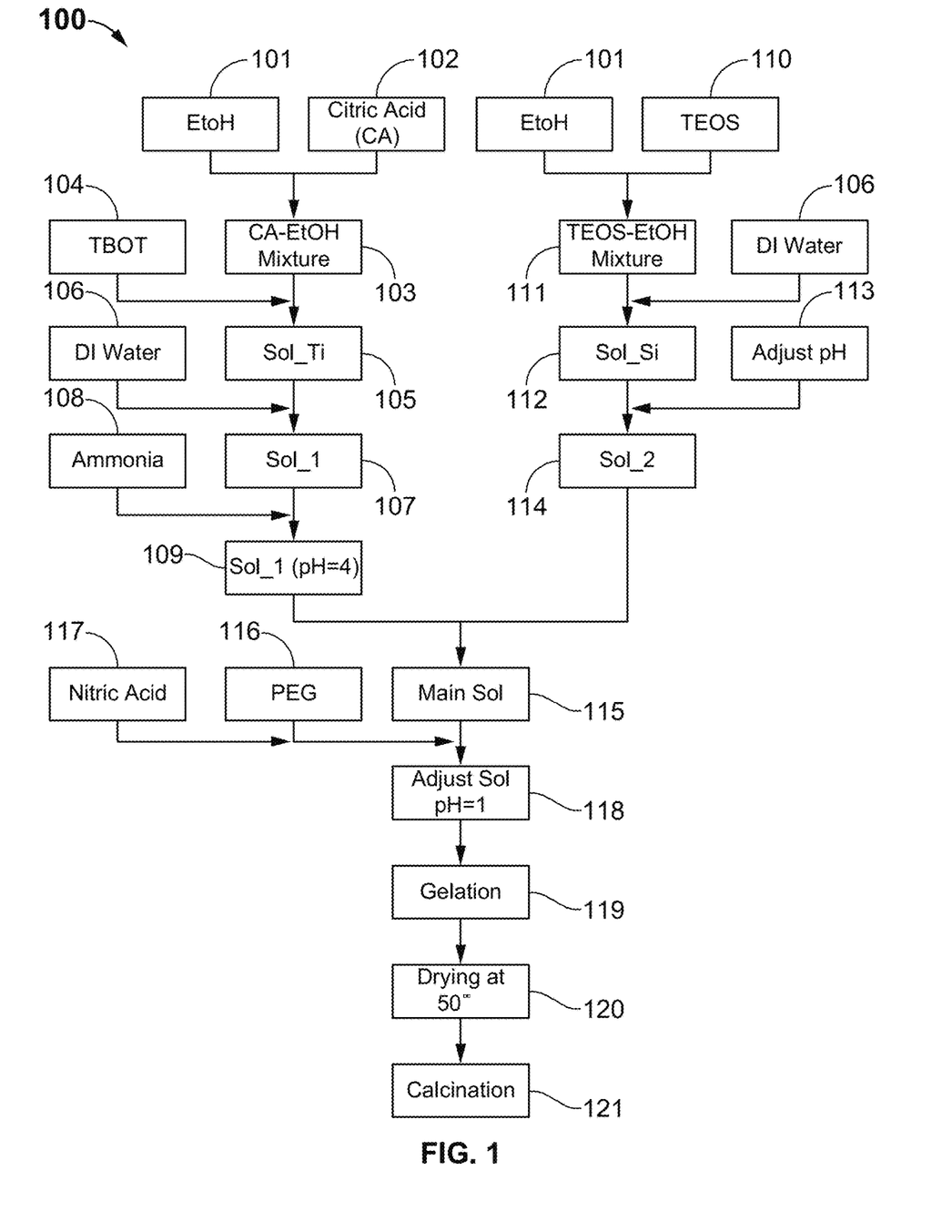
FIG. 1 exemplarily illustrates a method of producing a mixed oxide nanocomposite catalyst-adsorbent, according to an embodiment of the present invention.

Referring to FIG. 1, a method 100 of preparation of amorphous mesoporous titania-silica nanocomposite ODS catalyst-adsorbent with the aid of polymer and chelating agent, wherein the method drastically enhances the ODS activity of the catalyst adsorbent. In one embodiment, the method is capable of complete removal of sulfur compounds in a period of about 1 to 2 minutes of ODS reaction. In one embodiment, the method 100 of preparing amorphous mesoporous titania-silica nanocomposite ODS catalyst-adsorbent comprising the steps of preparing a first solution 109, at one step. In one embodiment, the solution 109 comprises a chelating agent, an alcohol, alkoxides precursor of titania, and water.

The first solution 109 is prepared by the following steps of: (a) dissolving of a predefined amount of chelating agent such as citric acid (CA) 102 in the alcohol such as ethanol (EtOH) 101 to form a mixture, wherein the mixture is a CA-EtOH mixture 103; and (b) adding alkoxides precursor of titania to the CA-EtOH mixture 103 to form a titanium solution (Sol_Ti) 105 and adding a predefined amount of distilled water (DI water) 106 to the solution 105 to form the first solution 107. In one embodiment, the alkoxide precursor of titania is tetraethyl orthotitanate (TBOT) 104. In some embodiments, the alkoxide precursor of titania include, but not limited to, titanium (IV) isopropoxide, tetrabutyl orthotitanate, titanium chloride, and titania. In one embodiment, the weight ratio of citric acid 102 to alkoxides of titania 104 is between 0 and 2. Further, the pH of the first solution 107 is adjusted by adding a predefined amount of ammonia 108, to obtain the required pH adjusted first solution 109. In one embodiment, the pH of the first solution 109 is maintained at 4.

At another step, a second solution 114 is prepared using alkoxides precursor of silica, DI water 106 and alcohol. The second solution 114 is prepared by the following steps of: (a) dissolving a predefined amount of alkoxides precursor of silica in EtOH 101 to form a mixture; and (b) adding a predefined amount of DI water 106 to the mixture, wherein the mixture agitated to form the silica solution (Sol_Si) 112. In one embodiment, the alkoxides precursor of silica is a tetraethyl orthosilicate (TEOS) 110. In some embodiments, the alkoxides precursor of silica could be selected from a tetramethyl orthosilicate, a tetrapropyl orthosilicate, and a tetrabutylortho silicate. In one embodiment, the mixture is a TEOS-EtOH mixture 111. Further, the pH of the silica solution 112 is adjusted to obtain a required second solution 114.

At another step, the first solution 109 and the second solution 114 are mixed together to form a main solution 115. In one embodiment, the mole ratio of first solution 109 and the second solution 114 is ranges from 2:1 to 200:1. In one embodiment, the mole ratio of first solution 109 and the second solution 114 is preferably ranges from 10:1 to 50:1. At another step, an organic polymer and nitric acid 117 are added to the main solution 115 and agitated to form a viscous transparent gel 119. In one embodiment, the organic polymer is PEG 116, wherein the molar weight of PEG 116 is ranges from about 200 g/mole to 200000 g/mole. Further, the organic polymer such as PEG 116, nitric acid 117 and main solution 115 forms a mixture 118, wherein the pH of the mixture 118 is adjusted to 1. The pH adjusted mixture 118 is further agitated for a period of at least 2 hours at about 50° C. to form the viscous transparent gel 119, wherein the viscous transparent gel 119 is aged at about 50° C. for a period of about 48 hours.

At another step, drying of aged gel 120 is performed at a temperature of about 50° C. for a certain period time. At another step, the dried transparent viscous gel 120 undergoes calcination process 121, wherein the calcination is conducted in two stages. The calcination temperature of catalyst is ranges from about 100° C. to about 700° C. The calcination atmosphere comprises fixed air, moving air, nitrogen gas, and argon gas. The calcination time is between 1 and 13 hours. The dried viscous gel 120 is calcinated 121 with air at a predefined temperature and heating rate for a period of time. In one embodiment, the transparent viscous gel is calcinated with air at a temperature of about 200° C. with heating rate of about 3° C./min for a period of about 3 hours. The calcinated transparent viscous gel is again calcinated at a temperature of about 600° C. for 3 hours with heating rate of about 1° C./min to prepare the amorphous mesoporous titania-silica ($TiO_2$—$SiO_2$) nanocomposite oxidative desulfurization (ODS) catalyst-adsorbent.

The prepared catalyst-adsorbent is a metal oxide catalyst-adsorbent, which includes silica and titanium oxides. In one embodiment, the molar ratio of silica to titania is selected between 2/1 and 200/1. In one embodiment, the molar ratio of silica to titania is preferably selected between 10/1 and 50/1. Further, the catalyst-adsorbent is in amorphous form and is characterized by specific surface area, ore volume and average pore diameter. In one embodiment, the catalyst comprises the specific surface area up to 1200 $m^2$/g, pore volume up to 2.0 $cm^3$/g, and pore diameter up to 50 nm. The ratio of polyethylene glycol and citric acid controls the pore diameter and porosity volume of catalyst-adsorbent.

The prepared amorphous mesoporous titania-silica nanocomposite ODS catalyst-adsorbent may be a dual function material, which is capable of catalyzing the oxidation of refractory sulfur compounds of liquid hydrocarbon fuels. At the same time, the dual function material performs an ultra-low level removal of oxidized sulfur compounds from the hydrocarbon fuels. Hence, the dual function material eliminates the need of either an extraction solvent in the ODS reactor or a subsequent extraction unit, which substantially reduces the process cost.

In one embodiment, the present invention further discloses a method for performing an oxidative desulfurization (ODS) of liquid hydrocarbon fuels using the amorphous mesoporous titania-silica ($TiO_2$—$SiO_2$) nanocomposite ODS catalyst-adsorbent under the presence of oxidant. In one embodiment, the oxidant comprises one or more organo-hydroperoxides. The method of ODS comprising the steps of adding oxidant agent to the hydrocarbon feedstock containing organosulfur compounds in a predefined temperature and pressure at one step. In one embodiment, the hydrocarbon feedstock contacts the oxidant at a temperature ranges from 20° C. to 200° C. and the pressure ranges from 0.5 atm to 20 atm to produce a gaseous oxidant-enriched hydrocarbon feedstock.

In one example, the hydrocarbon fuels include, but not limited to diesel fuel, kerosene, gasoline, gasoil, natural gas condensate, mazut, lubricant and bitumen. The liquid hydrocarbon fuel comprises a plurality of recalcitrant sulfur compounds. The sulfur compounds in the hydrocarbon fuels contain thiophene, benzothiophene, alkyl substituted benzothiophene, dibenzothiophene and alkyl substituted dibenzothiophene and other poly aromatic organosulfur compounds.

At another step, the amorphous mesoporous titania-silica ($TiO_2$—$SiO_2$) nanocomposite ODS catalyst-adsorbent is mixed with the produced gaseous oxidant-enriched hydrocarbon feedstock to perform desulfurization, thereby removing refractory sulfur compounds from the liquid hydrocarbon fuels. In one embodiment, the oxidized sulfur compounds are subsequently separated from the oxidant-enriched hydrocarbon feedstock via adsorption on the catalyst-adsorbent surface. The oxidized sulfur compounds could be sulfones and/or sulfoxide, which are further removed from the catalyst-adsorbent by the later processing, in which the catalyst is regenerated for reuse in the process.

In one embodiment, the catalyst-adsorbent comprises titania-silica nanocomposite. The amorphous mesoporous catalyst-adsorbent is consisted of matrix selected from silica, alumina, ceria, zirconia, niobia and mixtures thereof on which at least one metal oxide selected from among titanium, tungsten, vanadium, molybdenum, chromium, manganese, etc. are dispersed homogeneously. The molar ratio of the matrix selected from silica, alumina, ceria, zirconia, niobia as well as mixture thereof, and the dispersed metal oxide preferably selected from the oxides of titanium, Vanadium, molybdenum, tungsten, chromium, tin, manganese and mixture thereof is between 2:1 and 200:1. In one embodiment, the preferred molar ratio is between 10:1 and 50:1. Further, the desulfurization of liquid hydrocarbon fuels is performed in a reactor includes any one of a batch reactor, a fixed bed reactor, a moving bed reactor, and a continuous stirred tank reactor.

In one embodiment, the method of synthesizing the amorphous mesoporous titania-silica nanocomposite catalyst-adsorbent for the ODS of organosulfur components, is disclosed, wherein the catalyst-adsorbent is composed of at least any one of the oxides of transition metals such as titanium, vanadium, molybdenum, tungsten, chromium, tin and mixtures thereof, which is highly dispersed on/in a matrix of silica, alumina, ceria, zirconia, niobia and mixture thereof. In one embodiment, the oxygen donor is an important factor of ODS process, wherein the right choice of oxidant depends on the factors such as oxidizing power, active oxygen, cost, environmental friendliness and accessibility. In some embodiments, the ODS could use various oxidants such as $H_2O_2$, tert-butyl hydroperoxide (TBHP), cumene hydroperoxide (CHP), air, molecular oxygen, etc.

One oxidant may be an organic hydroperoxides such as TBHP, which could completely oxidize the refractory sulfur compounds of fuels in the presence of silica-titania catalyst-adsorbent. Further, TBHP is highly soluble in fuel and thus suppresses the mass transfer resistance, which in turn makes the exploitation of a fixed bed ODS reactor more feasible. Also, TBHP oxidant is not extremely sensitive to metal pollution.

In one embodiment, the ODS reaction and in-situ adsorption of sulfur compounds could be carried out at a pressure in the range of about 0.5 atm to about 15 atm, and preferably about atmospheric pressure. In one embodiment, the ODS reaction and in-situ adsorption of sulfur compounds could be carried out at a temperature in the range from 20° C. to about 150° C. with a reaction time in the range of from about 0.5 minutes to about 180 minutes. The concentration of refractory sulfur compounds of fuels is between 1 ppmw and 5000 ppmw. In one embodiment, the desulfurized liquid hydrocarbon fuel comprises the sulfur content of less than 5000 ppm. In one embodiment, the desulfurized liquid hydrocarbon fuel preferably contains less than 2000 ppm and more preferably contains about 500 ppm. For instance, hydrocarbon cut with boiling range of 150° C. to 360° C. with a sulfur content of about 500 ppm, could be subjected to ODS. The desulfurization reaction is preferably carried out in a single organic phase without the addition any extractive solvent.

The examples described herein relate to the preparation methods of amorphous mesoporous titania-silica ODS catalyst-adsorbent using PEG and citric acid assisted modified sol-gel process. Examples contain, but are not limited to titania-silica, and the like. Additionally, the examples describe the method of oxidative desulfurization of liquid hydrocarbon fuels containing refractory organosulfur compounds using the prepared catalysts.

EXAMPLE—1

The modified sol-gel method is applied to prepare the catalyst-adsorbent sample. In one embodiment, the method of preparing the sample comprises the following steps. At one step, a monophasic clear solution or Sol-T (Solution-T) is prepared. First, a CA-EtOH mixture is formed by dissolving 42 g of citric acid in 192 cc of EtOH. Further, tetrabutyl orthotitanate (TBOT) of about 14.56 cc is added to the CA-EtOH mixture. In addition, 74 cc of water is then carefully added to the prepared mixture to form the monophasic clear solution or Sol-T (Solution-T). At another step, a Sol-S (Solution-S) is prepared. First, 50 ml of Tetraethyl orthosilicate (TEOS) is dissolved in 25.6 cc of water.

Further, 50 cc of EtOH is added and agitated to form the Sol-S. The Sol-T and Sol-S are stirred separately for a period of about 3 hours. At another step, the Sol-T and Sol-S are mixed together and agitated for additional 3 hours. At another step, the polyethylene glycol (PEG 4000) of about 64 g is added to the above mixture. In one embodiment, the pH of the PEG added mixture is adjusted to 1, wherein the pH adjusted solution is then attired at about 50° C. for 2 hours to obtain the viscose transparent gel. The viscose transparent gel is aged and dried at 50° C. for 48 hours. At another step, the viscose transparent gel is calcinated in air at 200° C., with heating rate of 3° C./min for 3 hours. The calcinated gel is further calcinated at 600° C. for extra 3 h, heating rate of 1° C./min.

Figure 2:
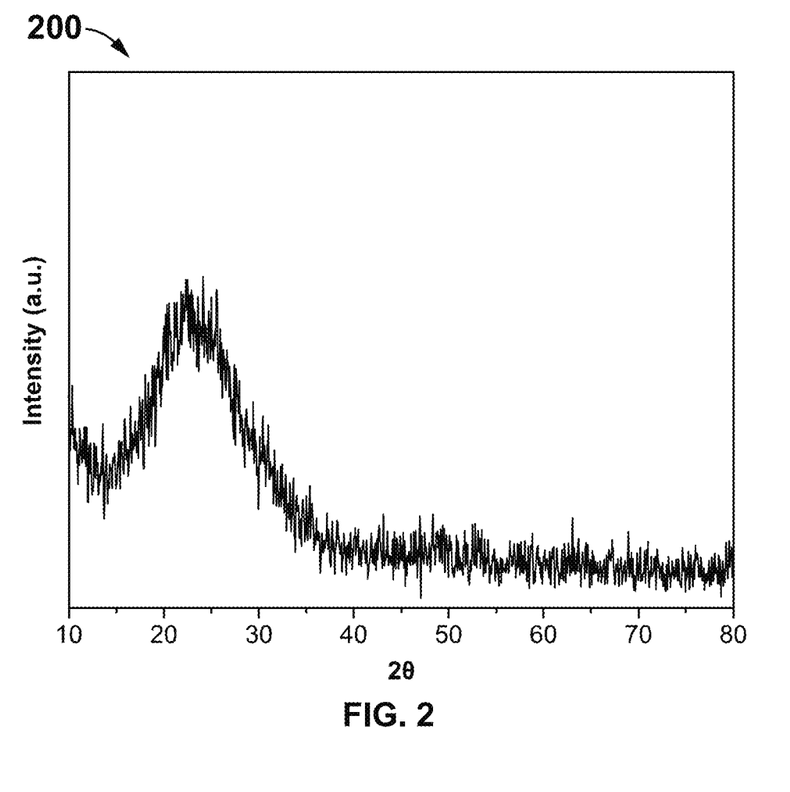
FIG. 2 exemplarily illustrates XRD pattern of amorphous mesoporous titania-silica nanocomposite ODS catalyst-adsorbent.

FIG. 2 shows the X-ray powder diffraction (XRD) pattern 200 of the prepared amorphous titania-silica catalyst-adsorbent and do not shows the crystalline structure, which indicates the highly dispersed titanium active species on the silica support. The XRD pattern 200 shows only one wide-ranging diffraction peak. In one embodiment, the wide-ranging diffraction peak is appeared at an angle in the range of $2\theta=15°<\theta<30°$, as a result it demonstrates the amorphous characteristic of the material. The result suggests that titanium species is highly dispersed on silica matrix when PEG and citric acid are used as template and complexing agent, respectively.

EXAMPLE—2

In another embodiment, the method of preparing the sample comprises the following steps. At one step, A g of citric acid is dissolved in B cc of EtOH to form the CA-EtOH mixture, wherein C cc of TBOT is added to the CA-EtOH mixture. Further, D cc of water is carefully added to the above mixture to yield monophasic clear solution called Sol-T. At another step, Sol-S is prepared by mixing 50 ml of TEOS, 25.6 cc of water and 50 cc of EtOH. The prepared Sol-S and Sol-T are stirred for 3 hours. At another step, the Sol-S and Sol-T are mixed together to form the main solution, wherein the main solution is agitated for extra 3 hours.

At another step, E g of PEG is poured into the main solution, wherein the pH of the solution is adjusted to 1 and then continuously stirred for a period of 2 hours at 50° C. to obtain a viscose transparent gel. The viscose transparent gel is aged at 50° C. for a period of 1 week and dried at the similar condition to yield the gel in the form of powder. At another step, the powder is calcinated in air at 230° C. for 3 h and the heating rate of 3° C./min. The calcinated powder is again calcinated at the temperature of about 600° C. for another 3 h with the heating rate of 3° C./min. The various ranges (A, B, C, D and E) of parameters for the preparation of one or more ODS catalyst-adsorbent samples (S1, S2, S3 and S4) are presented in Table—1.

TABLE 1

Various combination of synthesis parameters for one or more ODS samples

| Sample | A (g) | B (cc) | C (cc) | D (cc) | E (g) |
|--------|-------|--------|--------|--------|-------|
| S1 | 67 | 215 | 23.9 | 82.5 | 70.55 |
| S2 | 34.2 | 127.7 | 6.7 | 67.1 | 53.35 |
| S3 | 53.1 | 270.3 | 14.6 | 47.7 | 64 |
| S4 | 77.4 | 440 | 35.3 | 92.1 | 74.7 |

Figure 3:
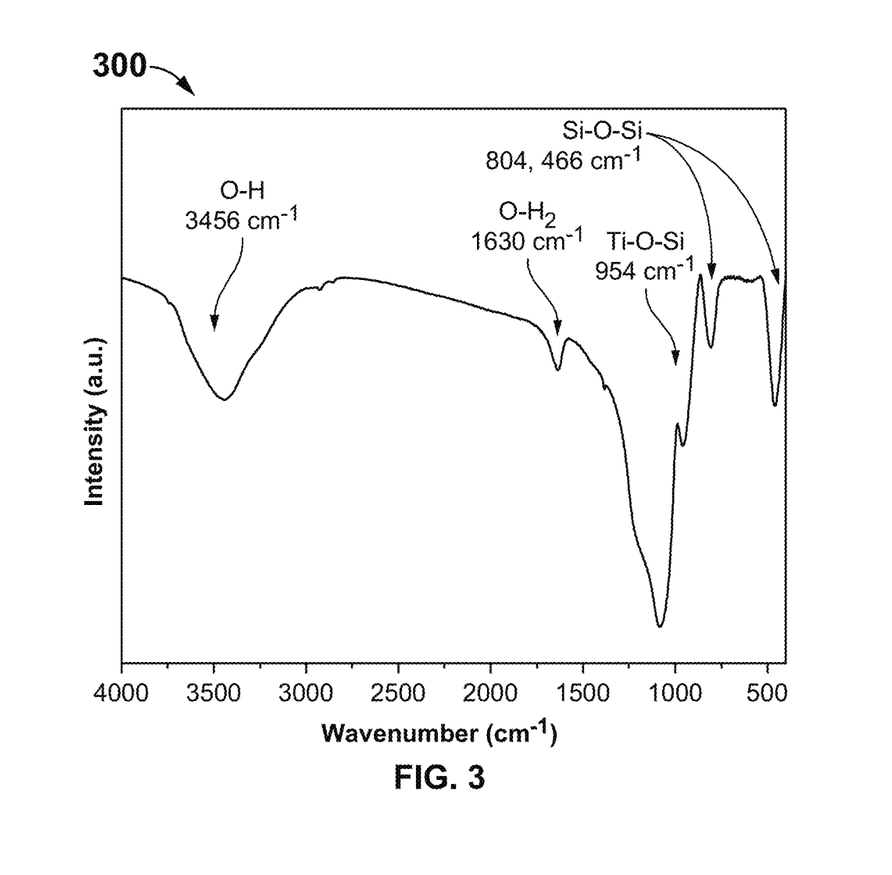
FIG. 3 exemplarily illustrates FTIR spectrum of amorphous mesoporous titania-silica nanocomposite ODS catalyst-adsorbent, and FIG. 4 exemplarily illustrates SEM image and elemental mapping of amorphous mesoporous titania-silica nanocomposite ODS catalyst-adsorbent, according to one embodiment of the present invention.
Figure 4:
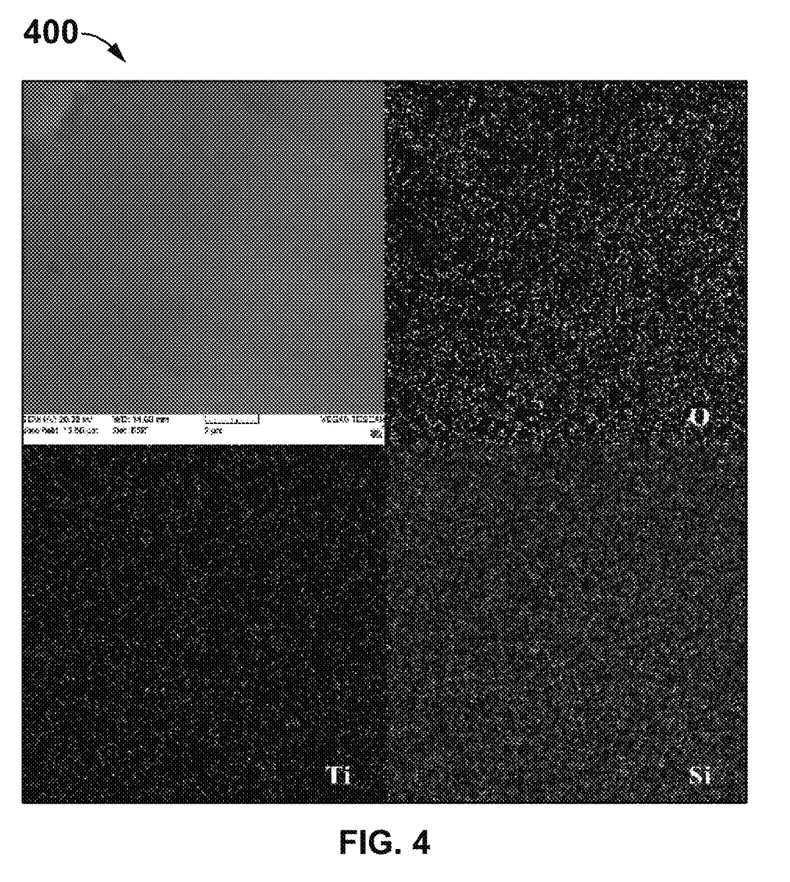

Referring to FIG. 3, the FTIR spectrum 300 of titania-silica nanocomposite catalyst-adsorbent, is disclosed. The peaks at 954 $cm^{-1}$ might be attributed to the vibration of Si—O—Ti bonds, which is made via the interaction between silicon and titanium species. However, no peaks corresponding to Ti—O—Ti linkages could be observed at 1450 $cm^{-1}$, which demonstrates that surface Ti species have less connections on the surface and are present as monomeric Ti moieties. Due to the absence of representative peaks assigned to crystalline $TiO_2$ in XRD pattern 200 and lack of peaks attributed to the Ti—O—Ti bonds in FTIR spectrum 300, it could be concluded that forming Si—O—Ti, which prevents the titania from the formation of large particles and separate phases. Further, the SEM image and elemental mapping 400 of titania-silica catalyst of Example—1 are represented in FIG. 4. The consistent with the elemental mapping results the homogeneous dispersion of Ti atoms on the silica matrix.

EXAMPLE—3

In another embodiment, the catalyst is prepared same as Example—1 except the use of EtOH. Instead of EtOH, a higher alcohol is used for the preparation of catalyst. In one embodiment, the higher alcohol includes, but not limited to, propanol and butanol.

EXAMPLE—4

In another embodiment, the method of preparing the sample comprises the following steps. At one step, titanium powder is dissolved in the mixture of hydrogen peroxide of 30% wt. and ammonia of 25% wt. with the volume ration of 4/1. At another step, the prepared solution is stirred for 3 hours followed by the addition of the solution of citric acid and ammonia with molar ratio of 1. At another step, the resulted mixture is refluxed for 10 hours and heated at 50° C. until the formation of gel. At another step, the gel is poured in the Sol-T, which is a mixture of water, citric acid and EtOH. In addition, Sol-S is prepared by mixing 25 ml of tetraethyl orthosilicate (TEOS), 12.8 cc of water, and 25 cc of EtOH. The Sol-S and Sol-T are stirred separately for 3 hours.

At another step, Sol-S is added drop-by-drop to the Sol-T at room temperature and stirred for 2 hours. The molar ratio of citric acid to silicon and titanium is adjusted to 0.7, wherein the gel is formed at the temperature of to 50° C. The gel is then aged at 50° C. for 72 h, wherein the aged sample is dried at similar operating condition. At another step, the sample is calcinated in air at 200° C., with heating rate of 3° C./min for 3 h. The calcinated sample is further involved to second calcination process at 600° C. for extra 3 h, heating rate of 1° C./min.

EXAMPLE—5

In another embodiment, the catalyst is prepared same as Example—1 except the complexing agent. The complexing agent such as oxalic acid or maleic acid are used instead of citric acid.

EXAMPLE—6

The ODS reactor test of catalyst prepared by Example—1, is disclosed. The test is performed at 80° C. in a 50 ml round-bottom flask which is equipped with condenser, thermometer, and magnetic stirrer. 0.2 g of catalyst and tert-butyl hydroperoxide (TBHP) (molar ratio of O/S=5) are simultaneously added to start the reaction in the 20 g of a diesel fuel containing 500 ppm S. The extent of reaction progress is determined by sampling at different times. The samples are analyzed by gas chromatography (Varian 3400 GC) equipped with a pulsed flame photometric detector (PFPD). The 100% removal of refractory sulfur compounds is obtained within 2 min.

EXAMPLE—7

The ODS reactor test is carried out same as Example—6 except the use of TBHP, wherein cumene hydroperoxide is used instead of TBHP with the same molar ratio (molar ratio of O/S=5 at 80° C.). Further, the catalyst prepared by Example—2 is applied in order to obtain the complete removal of sulfur compounds after 1 min.

EXAMPLE—8

The method of generating the catalyst-adsorbent utilized in Examples—6 and 7 is disclosed. The catalyst is separated from fuel by centrifugation. Then, it is washed several times by solvents such as methanol, acetonitrile, dimethylformamide or sulfolane. The regenerated, dried and calcined catalyst is used for ODS of the diesel fuel of Example—6 for ten times and no appreciable loss of activity is observed.

According to the present invention, the low-cost catalyst-adsorbent shows a very high activity for the complete removal of refractory sulfur compounds of liquid hydrocarbon fuels after very short time of ODS reaction. The ODS reaction and the adsorption are taking place on the surface of the catalyst-adsorbent, simultaneously. The process promotes the textual properties of catalyst-adsorbent. The textual properties include, but not limited to, specific surface area, pore volume, pore diameter and titanium dispersion on silica surface. Therefore, the diffusion of bulky sulfur compounds into the pores of catalyst-adsorbent, the rate of ODS reaction on highly dispersed titanium active sites and the adsorption of oxidized sulfur compounds on the surface are enhanced significantly.

Further, the synthesis method eliminates the need of expensive surfactant as structure directing agent or special consideration such as hydrothermal condition or supercritical drying. Also, the method operates under low drying and calcination temperature. All of which makes the synthesis procedure more economical than similar products. Further, the catalyst could be regenerated by simple washing with a solvent. In some embodiments, the washing solvent comprises dimethylformamide, acetonitrile, alcohol, dimethyl sulfoxide, sulfolane, and water.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method.

Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

The invention claimed is:

1. A composition for oxidative desulfurization of liquid hydrocarbon fuels, comprising:
    an amorphous mesoporous titania-silica ($TiO_2$—$SiO_2$) nanocomposite oxidative desulfurization (ODS) catalyst-adsorbent, a chelating agent, an alcohol, an alkoxides precursor of silica and titania, water, an organic polymer and a textural agent.

2. The composition of claim 1, wherein the chelating agent is selected from at least any one of a citric acid, an isosteric acid, an isocitric acid, an aconitic acid (cis and trans), a tranexamic acid as tricarboxylic acids, a tartaric acid, a mellitic acid, a carboxylic acid, a dicarboxylic acid, a tricarboxylic acid, an aminopolycarboxylic acid, a polycarboxylic acid, and a combination of mixture of chelating agents.

3. The composition of claim 2, wherein the carboxylic acid includes saturated dicarboxylic acids and unsaturated dicarboxylic acids, wherein the saturated dicarboxylic acids include an adipic acid, and a succinic acid, wherein the unsaturated dicarboxylic acids include a maleic acid, a fumaric acid, a glutaconic acid (cis and trans), a muconic acid (cis-trans, cis-cis), a citraconic acid (cis).

4. The composition of claim 1, wherein the alkoxides precursor of silica comprises a tetraethyl orthosilicate, a tetramethyl orthosilicate, a tetrapropyl orthosilicate, and a tetrabutylortho silicate.

5. The composition of claim 1, wherein the alkoxides precursor of titania comprises a tetraethyl orthotitanate, a titanium (IV) isopropoxide, a tetrabuthyl orthotitanate, a titanium chloride, and a titania.

6. The composition of claim 1, wherein the organic polymer is at least any one of a polyethylene glycol (PEG), a polyvinyl alcohol (PVA), a polyvinylpyrrolidone (PVP), a polyacrylic acid (PAA), a polyacrylamide (PAM), and a combination of mixture of the organic polymers.

7. The composition of claim 1, wherein the textural agent is polyethylene glycol.

8. The composition of claim 1, wherein the liquid hydrocarbon fuels include diesel fuel, kerosene, gasoline, gasoil, natural gas condensate, mazut, lubricant and bitumen.

9. The composition of claim 1, wherein the amorphous mesoporous titania-silica ($TiO_2$—$SiO_2$) nanocomposite ODS catalyst-adsorbent efficiently removes refractory sulfur compounds from the liquid hydrocarbon fuels via adsorption on catalyst surface, wherein the amorphous mesoporous titania-silica ($TiO_2$—$SiO_2$) nanocomposite ODS catalyst-adsorbent further comprises a matrix and a metal oxide,
wherein the matrix is selected from at least any one of a silica, a alumina, a ceria, a zirconia, a niobia, and a combination of mixture of the matrix, and the metal oxide preferably selected from at least any one of oxides of titanium, a vanadium, a molybdenum, a tungsten, a chromium, a tin, a manganese and a combination of mixture of metal oxides, wherein the matrix and the metal oxide are used in a molar ratio in the ranges from 2:1 to 200:1, and preferably ranges from 10:1 to 50:1.

* * * * *